Figure 1:
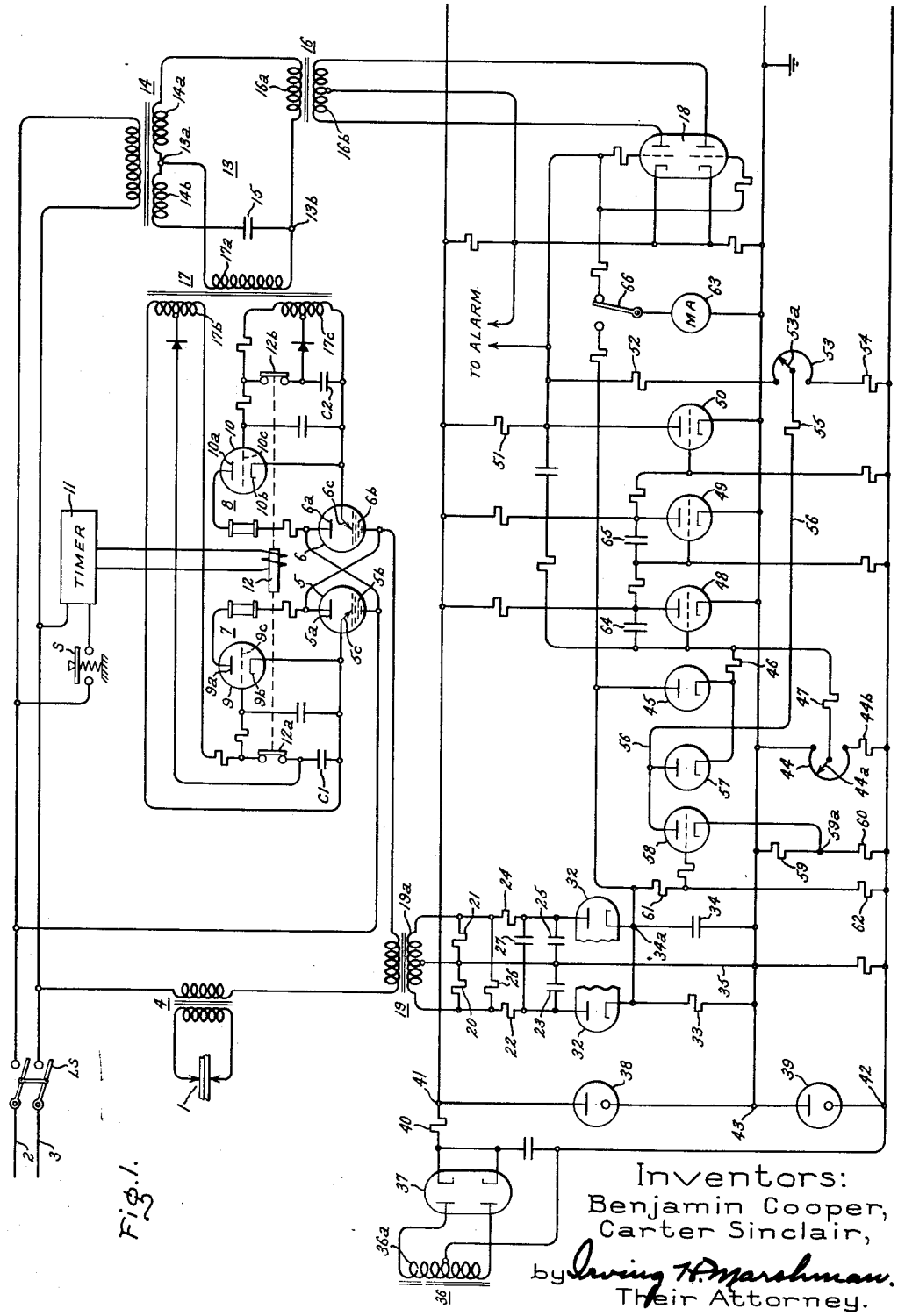

Inventors:
Benjamin Cooper,
Carter Sinclair,
by Irving H. Marshman.
Their Attorney.

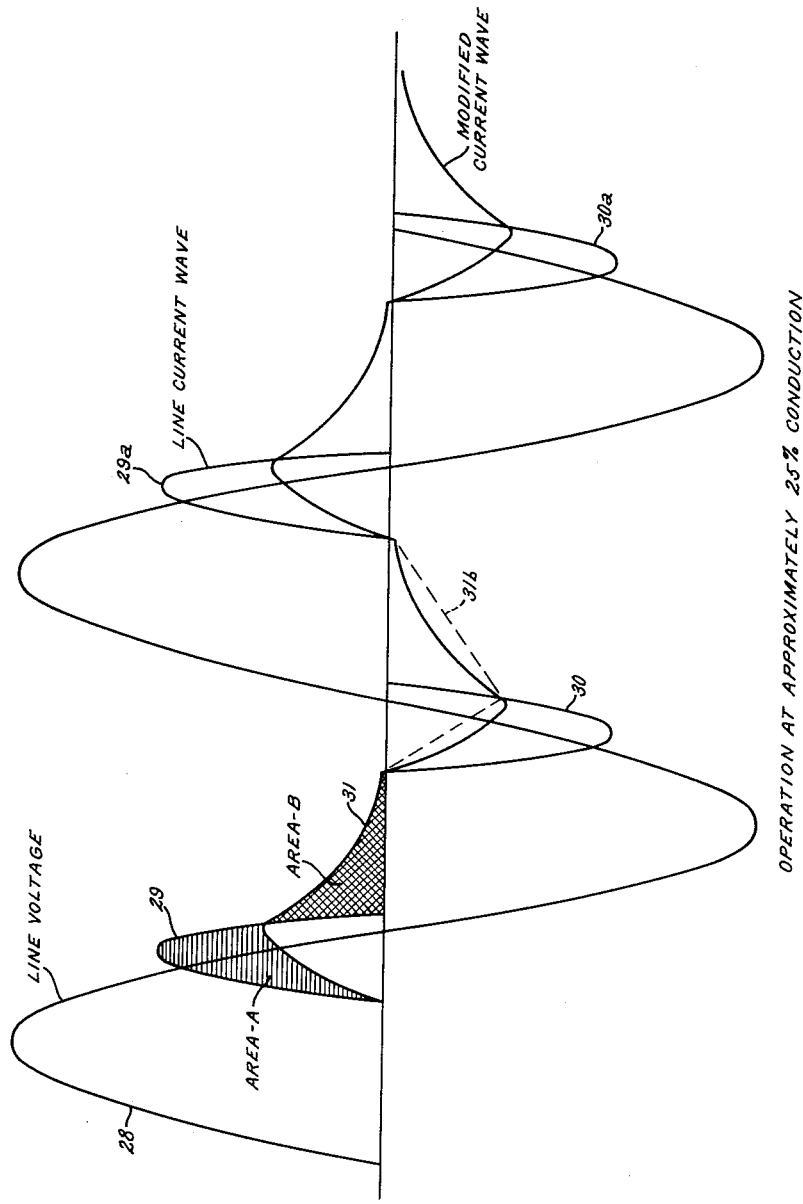

United States Patent Office 2,975,356
Patented Mar. 14, 1961

2,975,356
CURRENT REGULATOR

Benjamin Cooper and Carter Sinclair, Waynesboro, Va., assignors to General Electric Company, a corporation of New York Filed June 19, 1956, Ser. No. 592,442

4 Claims. (Cl. 323—4)

This invention relates to electric valve translating apparatus; more particularly to current regulators for electric valve systems, and it has for an object the provision of a simple, reliable, improved and inexpensive regulator of this character.

More specifically, the invention relates to current regulators for electric valve systems and it has for a further object the provision of an improved and inexpensive regulator for maintaining the effective value of current in a load circuit substantially constant irrespective of line voltage changes, load circuit impedance or other influencing factors which might otherwise cause the current to vary.

Still more specifically, the invention relates to regulators for electric valve apparatus of the type employing an ionizable medium and having an input circuit and an output circuit. When supplied from a source of alternating voltage, the effective value of the current in the output circuit may be controlled by controlling the firing point of the valve apparatus in each cycle of supply voltage. If the firing point occurs at or near the beginning of the positive half cycle, i.e. maximum advance, conduction continues throughout the remainder of the positive half cycle and the effective value of the current in the output circuit is maximum. Similarly, if the firing point occurs near or at the end of the positive half cycle, i.e. maximum phase retard, the effective value of the output circuit current is minimum or zero. For intermediate firing points, the current has corresponding intermediate values. For the purpose of maintaining the current constant at a predetermined value, a signal voltage representative of its root mean square value is compared with a reference voltage of predetermined value and the difference is utilized to vary the firing point of the valve apparatus.

In carrying the invention into effect into one form thereof, the measure of the root mean square value of the current in the output circuit is obtained by means of a current transformer supplied from the output circuit current and a resistance-reactance network associated with the secondary winding of the current transformer. The voltage at the terminals of the secondary of the current transformer is generally sinusoidal, but discontinuous in each half cycle owing to the phase angle control of the electric valve apparatus. This discontinuous sinusoidal voltage is converted to a continuous voltage of generally triangular wave shape of which the base of all triangles in the wave are equal. The measure of the root mean square value of the current thus obtained is compared with a reference voltage of predetermined value and the difference in their magnitudes is utilized to advance or retard the firing point of the valve apparatus so as to maintain the current constant at a predetermined value.

For a better and more complete understanding of the invention, reference should now be had to the following description taken in connection with the accompanying drawings of which Fig. 1 is an elementary, diagrammatical sketch of an embodiment of the invention and Fig. 2 is a chart of characteristic curves which facilitate an understanding of its operation.

Referring now to the drawing, the invention is illustrated as applied in an electric valve translating system for controlling the energization of a load circuit such as a resistance welding load circuit 1 from a source of alternating voltage such as the alternating voltage supply terminals 2 and 3 through electric valve translating apparatus which is illustrated as comprising a transformer 4 and a pair of reversely connected electric valves 5 and 6. A suitable circuit controlling means or switch LS is connected between the supply terminals 2 and 3 and the translating apparatus.

Preferably the electric valves 5 and 6 are of the type which employs an ionizable medium such as a gas or vapor. As illustrated, they are provided with anodes 5a and 6a, cathodes 5b and 6b and control electrodes 5c and 6c respectively. Cathodes 5b and 6b are preferably mercury pools and the control electrodes 5c and 6c are of the immersion ignitor type having an extremity thereof extending into the associated mercury pool cathodes. Electric valves of this type are known as ignitrons.

For the purpose of firing the ignitrons 5 and 6, a pair of exciter circuits 7 and 8 are provided, each associated with a corresponding one of the ignitrons. Comprised in these exciter circuits are trigger or firing valves 9 and 10. These firing valves are also preferably of the type which employ an ionizable medium. They are provided with anodes 9a and 10a, cathodes 9b and 10b, and control electrodes 9c and 10c. Preferably, the cathodes are heated by means of heater elements supplied from a suitable source. Valves of this type are known as thyratrons.

The period during which the firing valves 9 and 10 are rendered conducting is determined by means of a timer control 11 which is illustrated conventionally in Fig. 1. It is supplied from a suitable source such as the alternating voltage supply terminals 2 and 3 to which it may be connected by means of an initiating switch S. The timer 11 actuates relay 12 which is provided with normally closed contacts 12a and 12b in the control electrode circuits of firing circuit thyratrons 9 and 10 respectively. When contacts 12a and 12b are closed, the negative voltages on capacitors C1 and C2 hold the control electrodes of thyratrons 9 and 10 negative to prevent their firing. When the timer 11 picks up relay 12 to open its contacts, the voltage from transformer 17 is permitted to reach the control electrodes 9c and 10c to fire thyratrons 9 and 10 at the desired phase angle. As a result of the conduction by the firing valves, the ignitron valves 5 and 6 are rendered conducting in the same half cycles as those in which the firing circuit valves conduct, and consequently they supply to the load circuit an alternating current of the same number of cycles duration as the number of cycles in which the firing circuit valves conduct.

The effective value of the current supplied to the output circuit 1 is controlled by controlling the firing point of the ignitrons 5 and 6 in each half cycle in which they conduct, and this is accomplished by controlling the firing point of the firing circuit valves 9 and 10 in each half cycle of their conduction. For the purpose of varying the firing points of the valves 9 and 10, a static impedance phase-shifting network 13 is provided. This network is supplied from the alternating voltage supply terminals 2 and 3 to which it is connected through a transformer 14 and the contacts of line switch LS. Although this phase-shifting network may be of any suitable type, it is preferably in the form of a bridge network of which two of the arms are opposite halves 14a and 14b of the secondary winding of transformer 14, the third arm is a capacitor 15 and the fourth arm is a variable impedance element such as the primary winding 16a of a transformer 16 of which the the secondary winding 16b is connected to be variably short circuited by means of an electric valve 18 which may be of any suitable type such for example as a 6AS7 twin triode electric valve. Across opposite bridge points 13a and 13b of the bridge network is connected the primary winding 17a of an input control transformer 17 which is provided with a secondary winding 17b connected in the input circuit of the firing circuit valve 9 and also provided with a second secondary winding 17c which is connected in the input circuit of the firing circuit valve 10.

By controlling the conductivity of valve 18, variable resistance can be reflected through the transformer 16 to the arm of the phase-shift network in which is located the primary winding 16a. In other words, varying the conductivity of the valve 18 varies the resistance of the arm 16a thereby to vary correspondingly the phase of the voltage across the opposite bridge terminals 13a and 13b. As a result, the phase of the voltages supplied to the input circuits of the firing circuit valves is correspondingly varied thereby to fire these valves at points in their positive half cycles of anode voltage determined by the phase relationship of their input circuit voltages with respect to their anode voltages.

In order to regulate the current in the output circuit 1, i.e. to maintain it constant at a preset value, means are provided for deriving from the current in the load circuit a signal voltage which is a measure of the root mean square or effective value of the current and comparing such signal voltage with a constant reference voltage of adjustable value. The difference of the two voltages is utilized to control the conductivity of valve 18. The signal voltage is derived from the load circuit current by means of a current transformer 19 which is connected in the load circuit and which is illustrated as having a mid tapped secondary winding 19a. Across one half of the secondary winding is connected a resistor 20 and across the other half is connected a corresponding resistor 21. These resistors may have a suitable value such as 12,000 ohms each. Also connected across the first half of the secondary winding is a series combination of a resistor 22 and a capacitor 23, and across the other half is connected the series combination of resistor 24 and capacitor 25. The resistors 22 and 24 are equal and may have a suitable value such as 4700 ohms. Similarly the capacitors 23 and 24 are equal and may have a suitable value such for example as .1 mfd. Across the outside terminals of the secondary winding 19a may be connected a resistor 26 and a parallel capacitor 27. A suitable value for the resistor would be approximately 22,000 ohms but this might have to be varied to some extent to match the characteristic of the current transformer. A suitable value for the capacitor 27 would be .15 mfd.

The manner in which the current transformer and resistance-reactance network co-operate to produce a signal voltage which is a measure of the root mean square value of the current in the load circuit 1 will readily be understood by referring to the chart of characteristic curves in Fig. 2 in which the alternating voltage of the supply terminals 2 and 3 is represented by the sinusoidal wave 28. For a typical welding operation the firing points of the ignitrons 5 and 6 in each half cycle will be retarded so as to produce the positive sinusoidal current pulses 29, 29a, etc. and the corresponding negative sinusoidal current pulses 30, 30a, etc. It will be noted that owing to the phase retard of the firing points of ignitrons 5 and 6, the form of the current wave in the load circuit 1 is in general sinusoidal and is discontinuous in each half cycle of line voltage. The effect of the resistance-reactance network connected with the current transformer is to average the discontinuous current by cycles and thereby to change the shape of the wave in each cycle from a portion of a sine wave to a continuous wave of generally saw-tooth or triangular shape such as represented by the curve 31 which has equal positive and negative peak values. The shaded area A of pulse 29 is equal to the cross-hatched area B under the modified current wave 31 in the same half cycle. This is true for all subsequent half cycles and consequently the area under the modified curve 31 is equal to the area under the sinusoidal current pulses 29, 30, etc. It will be noted that the shape of each half cycle of the modified current wave 31 is approximately a triangle as indicated by the dotted line triangle 31b and the bases of all such triangles making up the wave are equal, i.e. each base is equal to 180 degrees of the line voltage. This will hold true for all values of current in the load circuit 1 in which the firing point of the valve is phase retarded, that is to say the modified current wave produced by the wave-shaping network will be a triangle wave shape with all triangles having equal bases of 180 degrees of the line voltage.

The root mean square values of the areas of all triangles having equal bases are proportional to the altitudes of such triangles. Consequently, the peak values of the current represented by the modified current wave 31 are a measure of the root mean square for all values of current in the load circuit 1 within the range between maximum advance and maximum retard of the firing points.

A direct signal voltage proportional to the root mean square of the actual current may be derived from the modified current wave by rectifying the modified current and taking a peak reading measurement. The modified current is rectified by means of a bi-phase rectifier which is illustrated as comprising both halves of a 6H6 double diode rectifying valve 32. In this connection the anode of one conducting path is connected to the junction of resistor 22 and capacitor 23 of the wave shaping network and the anode of the other conducting path is connected to the junction point of resistor 24 and capacitor 25. In the common cathode circuit of both conducting paths is connected a resistor 33 which is shunted by a capacitor 34. The resistor may have a resistance of the order of 100,000 ohms and the capacitor may appropriately have a capacity of .25 mfd. The output circuit of the rectifier is completed through a conductor 35 to the mid-tap of the second winding 19a. During each half cycle of the modified current wave 31 the capacitor 34 is charged to the peak value of the wave and is discharged to approximately 80% of its peak value thereby producing at its terminals a direct signal voltage which is proportional to the root mean square of the current in load circuit 1 and which contains a 20% ripple voltage.

For the purpose of providing a reference voltage with which to compare the signal voltage, there is provided a regulated source of direct voltage supply. It is illustrated as comprising a mid-tapped secondary winding 36a of a supply transformer 36, a double diode bi-phase rectifier valve 37 and a pair of voltage regulator glow discharge valves 38 and 39 connected in series relationship with each other and with a resistor 40 across the output terminals of the rectifier, i.e. from the common cathode terminal of rectifier valve 37 to the mid-tap of the secondary winding 36a. The primary winding (not shown) of transformer 36 is supplied from a suitable source of alternating voltage such as the supply terminals 2 and 3 to which it may be connected through suitable contacts on line switch LS. The turn ratio of the transformer may be of such value as to produce a voltage of suitable value, e.g., 640 volts at the terminals of the secondary winding. The rectifier valve 37 may likewise be of any suitable type such for example as a 5R4. Preferably the voltage regulator valves 38 and 39 produce at their terminals a rated voltage of 150 volts, so that a total voltage of 300 volts is produced across the terminals 41 and 42. Line voltage fluctuations are absorbed in the resistor 40 which appropriately may have a resistance of the order of 3900 ohms. The intermediate terminal 43 of the voltage regulator valves is grounded so that the voltage of terminal 41 is made 150 volts positive with respect to ground and the voltage of terminal 42 is made 150 volts negative with respect thereto. The negative terminals of the parallel resistor 33 and capacitor 34 are connected to the grounded terminal 43 so that the direct signal voltage at the positive terminal 34a of the capacitor is positive with respect to ground.

Across the grounded supply terminal 43 and negative voltage supply terminal 42 are connected in series relationship with each other a potentiometer 44 and a fixed resistor 44b. Appropriately, the potentiometer may have a resistance of .1 megohm and the fixed resistor 44b a resistance of .2 megohm. The voltage between ground and the slider 44a of the potentiometer is the reference voltage which, owing to the constancy of the voltage at the terminals of the regulating valve 39 remains sensibly constant at the value corresponding to the position to which the slider 44a is adjusted. For the purpose of comparing the current signal voltage with the reference voltage a connection is provided from the terminal 34a to the slider 44a which includes in series relationship a diode switching valve 45, a resistor 46 and a resistor 47. The valve 45 may be of any suitable type, for example one half of a 6H6 double diode valve. The resistors 46 and 47 may appropriately have values of one megohm each.

For the purpose of utilizing the difference in magnitude of the reference voltage and signal voltage to control the phase of the voltage supplied to the input circuit of the firing circuit valve, an amplifier is provided for detecting and amplifying the differences of these voltages and supplying the amplified difference to the input circuit of valve 18 which controls the impedance of the phase-shifting network. This amplifier, which may be of any suitable type, is illustrated as a three-stage amplifier having first, second and third stage amplifier valves 48, 49 and 50 with resistance coupling between the stages. Although the individual amplifier valves may be of any suitable type the first stage valve 48 is preferably one half of a 6SL7 twin diode valve and the second and third stage valves preferably are halves of a 6SN7 twin triode valve. The control electrode of the first stage valve is connected to the junction point of resistors 46 and 47.

In the anode circuit of the third stage valve 50 is a resistor 51, and between the anode and the negative voltage supply terminal 42a is connected a voltage divider which comprises fixed resistor 52, potentiometer resistor 53 and fixed resistor 54 connected in series relationship. To the anode of the third stage valve 50 are connected the control electrodes of the phase-shift control valve 18. The resistors 51 and 52 have relatively low resistances, e.g. of the order of 50,000 and 10,000 ohms respectively, whereas the resistors 53 and 54 have relatively high resistances of the order of 1 megohm each.

During the periods of no weld the current in the load circuit 1 is zero and the regulator receives zero current signal. In the absence of any provision to prevent it, the regulator in responding to this condition would affect maximum advance of the firing point of electric valves 5 and 6. Consequently during each initiation of a welding period, maximum current would be supplied to the welding circuit instead of the desired value corresponding to the setting of the slider 44a of the reference voltage rheostat. To prevent this undesired operating condition during no weld periods, a standby voltage is supplied from the slider 53a of potentiometer 53 through resistor 55, conductor 56, switching diode valve 57 and resistor 46 to the control electrode of the first stage amplifier valve. A suitable valve for the resistor 55 would be of the order of 1 megohm. The valve 57 may be of any suitable type such for example as one half of a 6H6 twin diode valve.

For the purpose of inactivating the standby voltage supplied during periods in which welding current is actually flowing in the load circuit 1, an additional switching valve 58 is provided. This valve may be of any suitable type such as one half of a 6SL7 twin triode valve. Its anode is connected to the anode of valve 57 and its cathode is connected to an intermediate point of a voltage divider which comprises two resistors 59 and 60 connected in series relationship between the grounded terminal 43 and negative supply terminal 42. The resistors 59 and 60 may appropriately have values such for example as 10,000 ohms and 100,000 ohms respectively. The control electrode of valve 59 is similarly connected to an intermediate point of a voltage divider which comprises resistors 61 and 62 connected in series relationship between the cathode terminal 34a of the signal voltage rectifier and the negative supply terminal 42. In order to bias the valve 58 beyond cutoff at all times except when a signal voltage appears at termnial 34a indicating the flow of welding current in the load circuit, the resistors 61 and 62 may appropriately have values of 150,000 ohms and 1 megohm respectively.

An indicating instrument which is illustrated as a milliammeter 63 is provided for the purpose of enabling the operator to preset the slider of the potentiometer 53 in a position in which it will derive from the potentiometer and supply to the control electrode of the first stage valve 48 a voltage substantially equal to the voltage that is supplied from the voltage comparison network to such control electrode when the value of current flowing in the welding circuit is equal to the value preset on the reference potentiometer 44. Capacitors 64 and 65 are connected from the anodes to the control electrodes of first and second stage valves 48 and 49 respectively. These capacitors serve to counteract the ripple component of the rectified signal voltage across capacitor 34.

With the foregoing understanding of the elements and their organization the operation of the regulator will readily be understood from the following detailed description:

The line switch LS is closed to connect the load circuit 1 to the alternating voltage supply terminals 2 and 3 and to energize the phase-shift network transformer 14 and the control voltage supply transformer 36. The movable contact of switch 66 is moved to engage its right hand stationary contact and the reference voltage potentiometer slider 44a is preset to the position which corresponds to the desired value of the welding current. In this position, a few practice welds may be made by depressing the initiating switch S to energize the timer 11. During such practice welds the meter reading may be noted. Thereafter, and with no current flowing in the load circuit, the slider 53a of the standby voltage potentiometer is adjusted to a position which produces the same meter readings. Under these conditions there will be no appreciable changes in steady-state meter reading from weld to no weld conditions during subsequent operation. If the reference voltage potentiometer setting is subsequently adjusted to produce a substantially different value of welding current, it will be necessary to re-adjust the standby voltage potentiometer only by a slight amount to give a minimum flicker of the needle of the meter during the transition from no weld to weld conditions. Since the preset signal is taken from the anode of valve 50, a change in the reference voltage derived from potentiometer 44 will produce a nearly compensating change in the preset voltage from potentiometer 53. Such an adjustment causes the start of the weld to be made at substantially the same value of current as exists during the later regulated portion of the weld.

The operation of the regulator to maintain the current in the load circuit 1 constant is as follows:

Under no weld conditions, the valve 58 is biased to cutoff and no signal voltage is supplied to the comparison network. However a voltage is supplied from the slider 53a of the standby potentiometer through valve 57 to the control electrode of the first stage amplifier valve 48 and the amplifier operates to regulate and maintain the voltage supplied to the control electrode of the phase-shift control valve 18 constant at a value that corresponds to the setting of the slider 53a. A welding sequence is initiated by depressing the initiating switch S which causes the timer 11 to pick up relay 12 which permits the voltage supplied by the phase-shift network 13 to cause the firing circuit valves to become conducting and fire the main ignitron valves 5 and 6 at points in the positive half cycles of their anode voltages which correspond to the setting of slider 53a. The ignitrons 5 and 6 supply an alternating current to the welding load circuit 1. In response to this current in the load circuit, the current transformer supplies to the resistance-reactance network in the signal voltage circuit a current which is proportional to the current in the load circuit. The resistance-reactance network and the rectifier 32 co-operate in the manner previously described to produce across the resistor 33 and capacitor 34 a direct signal voltage which is proportional to the root mean square value of the current in the load circuit. This direct signal voltage is applied to the control electrode of switching valve 58 which in response thereto becomes conducting. The conducting path is traced from the slider 53a of the standby voltage potentiometer through resistor 55 and valve 58 to the point 59a on the voltage divider. As a result of the voltage drop produced across resistor 55 by conduction of valve 58, the anode of switching valve 57 is made much more negative than its cathode. Consequently it becomes non-conducting and ceases to supply standby voltage from the slider 53a to the control electrode of the first stage amplifier valve 48. However, the current signal voltage across resistor 33 and capacitor 34 is supplied through valve 45 to the comparison circuit in which it is compared with the reference voltage at slider 44a. Any difference in magnitude of these two voltages is amplified by the amplifier and the amplified voltage supplied to the control electrode of the valve 18. In response the conduction of this valve varies to vary the impedance arm of the phase-shifting network in the proper sense, either to increase or to decrease the current in the load circuit so as to reduce to a minimum the difference between the reference voltage and the signal voltage. At the end of the welding interval which is determined by the timer 11 the ignitron valves 5 and 6 cease to conduct current to the load circuit 1. Consequently the current signal voltage at the terminal 34a vanishes and the valve 58 becomes non-conducting. As a result, the anode voltage of valve 57 again becomes more positive than its cathode and the standby voltage which is determined by the setting of the slider 53a of the standby potentiometer is again supplied to the control electrode of the first stage valve 48. As a result, the voltage supplied to the control electrodes of a valve 18 is maintained at the correct value which is required to maintain an impedance of the phase-shift network 13 at the same value as when welding current is flowing in the load circuit 1.

Although in accordance with the provisions of the patent statutes, this invention is described as embodied in concrete form and the principle thereof has been explained together with the best mode in which it is now contemplated applying that principle, it will be understood that the apparatus shown and described is merely illustrative and that the invention is not limited thereto since alterations and modifications will readily suggest themselves to persons skilled in the art without departing from the true spirit of the invention or from the scope of the annexed claims.

What we claim as new and desire to secure by Letters Patent of the United States is:

1. A current regulator comprising a pair of alternating voltage supply terminals, electric valve means supplied from said terminals having an output circuit and an input circuit, a current transformer supplied from said output circuit, a resistance capacitance wave-shaping network connected to be supplied from the secondary winding of said current transformer for producing a voltage of generally triangular wave shape having a peak value related to the root means square value of the current in sadi output circuit a rectifier supplied from said network and having in its output circuit a capacitor across which is developed a direct signal voltage having a value proportional to said peak value, a source of direct reference voltage, and a phase angle control means connected to said input circuit and responsive to the difference of said reference voltage and said signal voltage for determining the firing point of said valve means in each cycle of supply voltage to maintain the effective value of said current substantially constant at a value related to said reference voltage.

2. A current regulator comprising a pair of alternating voltage supply terminals, electric valve means supplied from said terminals having an output circuit and an input circuit, a current transformer connected to be supplied from said output circuit, a full wave rectifier having a cathode and a pair of anodes supplied from the secondary winding of said transformer, a wave-shaping network connected between said secondary winding and said rectifier for converting a voltage of sinusoidal wave shape to a voltage of general triangular wave shape having a peak value related to the root mean square value of the current in said output circuit comprising a resistor and a capacitor connected in parallel circuits across each half of said secondary winding and a separate resistor in each of the anode circuits of said rectifier, a capacitor connected in the output circuit of said rectifier for producing at its terminals a signal voltage proportionally related to said peak value, a source of direct reference voltage and a phase angle control means connected to said input circuit and responsive to the difference of said reference voltage and signal voltage for determining the firing point of said valve means in each cycle of supply voltage to maintain the effective value of said current substantially constant at a value related to said reference voltage.

3. A current regulator comprising a pair of alternating voltage supply terminals, electric valve means supplied from said terminals and having an output circuit and an input circuit, means for controlling the firing point of said valve means in each cycle of supply voltage, a source of reference voltage, means for deriving from said output circuit a voltage of generally triangular wave shape having a peak value related to the root mean square of the current in said output circuit, means responsive to the difference in magnitude of said reference voltage and said peak value for controlling said firing point controlling means to maintain the root mean square value of the current in said output circuit substantially constant, a source of standby voltage to provide a substitute voltage for said derived voltage during periods of zero current in said output circuit, and take-over means responsive to current in said output circuit for rendering said substitute voltage ineffective.

4. A current regulator comprising a pair of alternating voltage supply terminals, first electric valve means supplied from said terminals having an output circuit and an input circuit, means for controlling the firing point of said valve means in each cycle of supply voltage, a source of reference voltage, means for deriving from said output circuit a voltage of generally triangular wave shape having a peak value related to the root mean square value of the current in said output circuit, means for controlling said firing point controlling means to maintain the effective value of the current in said output circuit substantially constant comprising an electric valve amplifier having an output circuit connected to said firing point control means and an input circuit connected to be supplied with a voltage related to the difference in magnitudes of said reference voltage and said peak value voltage, means for supplying to said amplifier input circuit a substitute voltage during periods of zero current in the output circuit of said first electric valve means comprising a source of standby voltage and connections from said standby source to said amplifier input circuit, an auxiliary electric valve having an anode and a cathode included in said connections and take-over switching means responsive to current in said output circuit of said first means for rendering said auxiliary valve non-conducting comprising a pair of direct voltage supply terminals, a voltage divider supplied therefrom and a second auxiliary electric valve having an anode connected to the anode of said first auxiliary valve, a cathode connected to a point on said divider having a voltage that is negative with respect to the cathode of said first auxiliary valve and a control electrode connected to be supplied with a voltage derived from the output circuit of said first electric valve means.

References Cited in the file of this patent

UNITED STATES PATENTS 2,431,248     Hartwig _____ Nov. 18, 1947